Aug. 19, 1941.     G. PLYMESSER     2,253,347

HYDRAULIC JACK OPERATING MECHANISM

Filed Nov. 6, 1939

Inventor:
Glen Plymesser
By Martin E. Anderson
Attorney

Patented Aug. 19, 1941

2,253,347

UNITED STATES PATENT OFFICE 2,253,347

HYDRAULIC JACK OPERATING MECHANISM

Glen Plymesser, Boulder, Colo.

Application November 6, 1939, Serial No. 303,081

9 Claims. (Cl. 254—1)

This invention relates to improvements in hydraulic jacks of the type employed in connection with the ordinary pleasure automobile and has reference more particularly to a carriage for supporting an ordinary hydraulic jack and to means for operating said jack from a point to the rear of the rearmost portion of the automobile.

The automobiles as now constructed are provided behind the rear axle with gasoline tanks, trunk carriers and bumpers in such a way that the body of the automobile extends several feet to the rear of the rear axle.

In case of tire trouble where it becomes necessary to raise the rear axle for the purpose of changing a tire or for other purposes, a lift jack must be introduced into the space between the roadway and the rear axle and operated.

In the ordinary jacks that are operated by means of a handle, it is necessary for the operator to lie on his back underneath the car in order to raise the axle to such a height as to effect the desired results.

The above difficulty has been recognized by others and various means have been produced for the purpose of operating hydraulic jacks from a point to the rear of the rear bumper and mechanical jacks have also been produced which have long operating handles by means of which they can be operated under the conditions above pointed out.

There are on the market today several good hydraulic jacks that are used quite extensively, but which are not provided with means for operating than under the conditions that prevail with the ordinary pleasure automobile.

The object of this invention is to provide a carriage on one end of which an ordinary hydraulic jack can be supported in such a way that it can be readily inserted into position beneath the rear axle housing of an automobile. The carriage is provided with a handle and link mechanism by means of which the pump can be operated and an extensible handle is also provided for opening and closing a valve that must be opened in order to permit the hydraulic piston to be retracted.

In order to describe this invention in such a way that it can be readily understood, reference will now be had to the accompanying drawing in which the invention has been illustrated in its preferred form, and in which.

Figure 1:
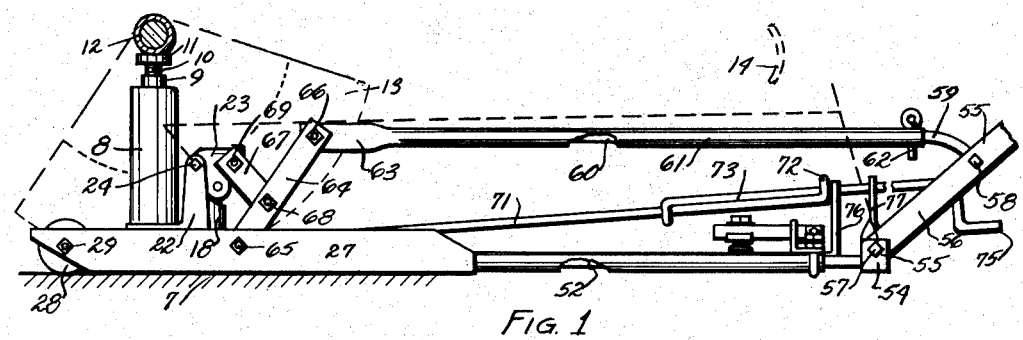
Figure 1 is a side elevation of the improved jack and carriage showing the same in position beneath the rear axle of an automobile, the axle and the rear bumper being shown in dotted lines.

In the drawing reference numeral 7 designates a surface on which the carriage and jack assembly are supported. Reference numeral 8 designates the cylinder of an ordinary hydraulic jack whose plunger or piston has been designated by reference numeral 9. The piston is provided with a threaded extension member 10 that terminates in a cap 11. In Figure 1 the rear axial housing has been designated by reference numeral 12 and the pneumatic tire by reference numeral 13, while the rear bumper has been indicated by dotted lines to which the reference numeral 14 has been applied. The hydraulic jack will not be described with any greater detail than necessary for the purpose of explaining this invention. The jack is provided with a base 15 which is preferably a casting and this base has a peripheral flange 16 which, in the embodiment illustrated, has been shown as rectangular. Strengthening ribs 17 are provided to give the parts rigidity. The jack has a pump cylinder 18 in which a plunger 19 is mounted for reciprocation. A packing box is provided at the upper end of the pump cylinder and the nut for compressing the packing material has been designated by reference numeral 20. A valve 21 serves to close the space between the cylinder and the oil storage compartment and when this is open, the plunger can be moved downwardly into collapsed position. On each side of the pump cylinder, are two upwardly extending brackets 22. A rocker socket 23 has its rear end positioned between the brackets 22 and is pivotally connected with the latter by means of a pin 24. The rocker socket is provided with downwardly projecting spaced lugs 25 between which the upper end of the piston 19 is positioned. A pin 26 extends through the lugs and through the upper end of the piston. In the ordinary jack a handle is introduced into the socket of the rocker 23 and by moving this up and down pump fashion, the plunger 19 is reciprocated and forces oil into the cylinder below the lower end of the plunger, all in a manner old and well known.

Figure 2:
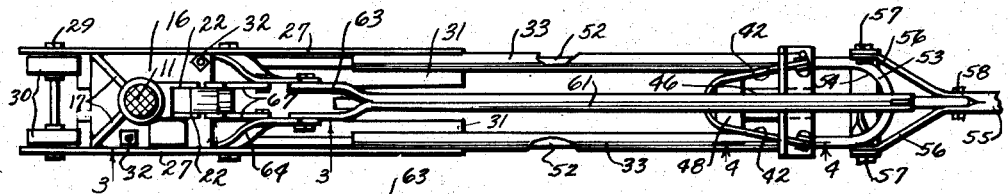
Figure 2 is a top plan view of the jack and carriage shown in Figure 1.
Figure 4:
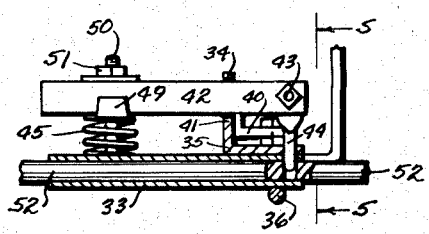
Figure 4 is a section taken on line 4—4, Figure 2, and shows the latch by means of which the telescopic parts of the carriage are held in adjusted position.
Figure 5:
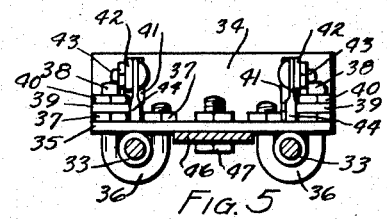
Figure 5 is a section taken on line 5—5, Figure 4.

A jack constructed as above described or constructed in a similar manner is positioned on the carriage which will now be described. The carriage consists of two short lengths of angle iron which have been designated by reference numerals 27. At the end to the left in Figures 1 and 2 the angle irons have been cut along an upwardly inclined line 28, so as to remove the lower flange 31. The vertical flanges directly above the inclined cuts, are provided with openings for the reception of a bolt 29 which serves as a bearing, or an axle for two rollers or wheels 30. The axle is provided with suitable shoulders to keep the wheels in spaced relation as shown in Figure 2. The jack is positioned on the horizontal flanges 31 and is preferably held in place by means of bolts 32. The bolts serve to keep the angle irons 27 from spreading, but may be omitted if desired as the carriage contains other elements that perform this function. Pipes 33 are electro-welded into the inside angle of angle irons 27 so as to become substantially integral with the latter. Pipes 33 extend outwardly to some distance where they are connected by a short piece of angle iron whose vertical flange has been designated by reference numeral 34 and whose horizontal flange has been designated by reference numeral 35. U-bolts 36 extend through holes in the flange 35 and are provided with clamping nuts 37 which, when tightened, secure the angle iron to the pipes in the manner shown in Figure 5. The outer legs of the U-bolts, which have been designated by reference numerals 38, are longer than the corresponding inner legs and to these an angular stop 39 is secured by means of a nut 40. This stop has been shown most clearly in Figure 4. The vertical flange 34 is provided with two rectangular openings 41 through which the levers 42 extend. Aattached to the outer ends of these levers by means of bolts 43, are pins 44. These pins extend through openings in the horizontal flange 35 and through registering openings in the pipes 33. The levers 42 are made from a single piece of strap iron bent into substantially U-shape as shown in Figure 2, and adjacent the bight of this U-shaped member, a compression spring 45 is positioned. The lower end of this spring rests on a plate 46 that is secured to the flange 35 by means of a bolt 47. A flat piece of iron 48 is positioned underneath the U-shaped lever 42 and this is provided at its ends with upturned lugs 49 that engage the outer surface of the lever. A bolt 50 extends through the supporting member 46 and through the transverse member 48. The nut 51 is tightened sufficiently to hold the spring compressed a certain amount. By exerting pressure on the bight of the lever 42, it will pivot in openings 41 and remove the pins 44 from the openings in bars 52 to which reference will now be made.

Telescopically connected with each tubular member 33 are bars 52 which, in the embodiment illustrated, are parts of a single piece bent at its middle in such a way as to form an elongated U-shaped member, whose base or bight has been designated by reference numeral 53. The bars 52 are provided with one or more diametrical openings for the reception of the pins 4. Attached to the bight 53 is a U-shaped member 54 whose ends 55 extend upwardly. The member 54 may be, and preferably is, electro-welded to the bight 53. A handle 55 having a forked end, the two parts of which have been designated by reference numerals 56, is pivotally connected to the upturned ends 55 by means of bolts 57. At the top of the angle formed by the arms 56, holes are provided for the reception of a pivot pin or bolt 58 which extends through an opening in the downwardly curved end 59 of a rod 60 that is telescopically connected with the tubular connecting rod 61. The rod 60 and the tubular connecting rod 61 have openings for the reception of a pin 62 that serves to hold these parts in longitudinally adjusted position. The tubular member 1 has its end to the left, when viewed as in Figures 1 and 2, split so as to form two arms 63 that are spread apart sufficiently to straddle the cylinder 8 of the hydraulic jack. Links 64 are pivotally connected at their lower ends to the vertical flanges of the angle irons 27 by means of bolts 65. The upper ends of links 64 are pivotally connected to the arms 63 by means of bolts 66. It is now evident that by rocking lever 55 about its pivots 57, a corresponding rocking motion is imparted to the links 64. The extent of this angular motion has been indicated by dotted lines in Figure 3, which dotted lines have been designated by reference numeral 64 to indicate that they represent the center lines of these links in their extreme positions. Links 67 have their lower ends attached to link 64 at a point between the pivots 65 and 66 by means of bolts 68. The upper ends of link 67 are connected with the rocker socket by means of a bolt 69.

Figure 3:
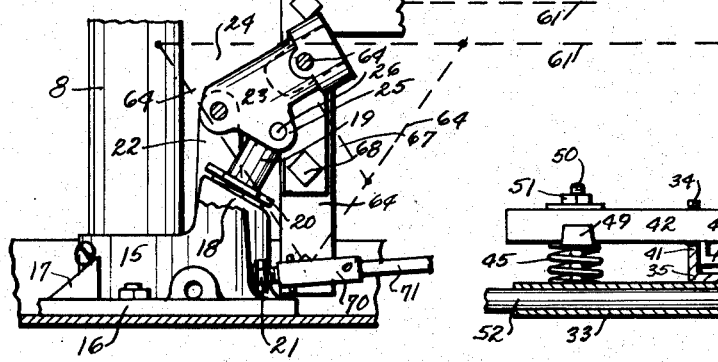
Figure 3 is a fragmentary section to a somewhat enlarged scale which section has been taken along line 3—3, Figure 2.

If we now refer to Figure 3, we will observe that if links 64 are moved towards the right of the extreme position designated by the dotted line, links 67 will assume angular positions that will force the rocker socket to turn clockwise about its pivot 24 and this motion will force the plunger 19 downwardly into the pump cylinder, thereby transferring oil into the cylinder 8 below the plunger. If we now move lever 55 so as to rock links 64 in a counterclockwise direction, the operation of levers 64 and 67 will move the rocker socket counterclockwise until it reaches the full line position shown in Figure 2, and if the motion is continued until the link 64 reached the extreme lefthand position, then the rocker socket will be moved in a clockwise direction and force the pump piston 19 into the pump cylinder. When the parts are moved towards the right until they assume the full line position shown in Figure 3, a complete cycle will have been accomplished and during this cycle the pump piston will have made two complete strokes.

Particular attention is called to this mechanism by means of which the pump is caused to make two complete strokes during each cycle of the operation of handle 55 because this double operation of the pump reduces the time necessary to raise a body through a given distance to one-half of that required where the pump makes a single stroke for each complete cycle of the operating handle.

Figure 6:
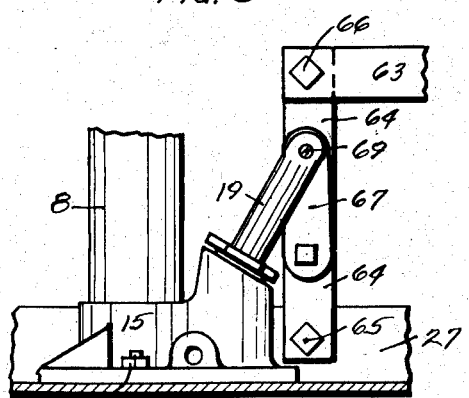
Figure 6 is a section similar to that shown in Figure 3, but showing a slightly modified form of the invention.

In Figure 6, a slightly modified form of the invention has been shown. In this embodiment the rocker socket has been omitted and the pump plunger has been increased in length to such an extent that its upper end is connected directly with the upper ends of links 67 by means of the pivot 69; in this embodiment the double reciprocation of the pump is effected in the same manner as in the construction above described.

When the embodiment illustrated in Figure 6 is employed, the pivot 65 of link 64 should be positioned on the axis of the plunger instead of to one side as shown in the drawing, because in the construction illustrated, the operation is unsymmetrical, but since this shows the analogy between the two constructions more completely than it would be shown if the parts were arranged in the manner pointed out, the drawing has been left as shown in order to make the operation more clearly apparent.

The valve which has been designated by reference numeral 21, has a short tubular extension 70 to which a rod 71 is attached. This rod is provided with an eyelet 72 that extends at right angles and another rod 73 provided with a similar eyelet 74 extends through the eyelet 72 and terminates in a crank 75. The bar 73 extends through openings in brackets 76 and 77. When the frame is extended the two rods 71 and 73 telescope and are also extended and when the frame or carriage is collapsed, these rods are correspondingly shortened. The valve can be controlled by operating the handle 75 and therefore the operator standing at the rear of the rear bumper can raise and lower the car without the necessity of getting underneath the same. The wheels or rollers 30 are for the purpose of facilitating the introduction of the jack into operative position.

The jack illustrated on the drawing and described herein is intended more particularly for use in garages and filling stations, but it can also be carried in the tool box of an ordinary pleasure car, due to the fact that it can be collapsed to such an extent that it requires a comparatively small amount of space.

Having described the invention what is claimed as new is:

1. A jack for elevating the rear axle housing of a vehicle having, in combination with the rocker-arm of the pump-shaft of a hydraulic jack-mechanism, of means for operating said pump rearwardly of said vehicle, said means comprising a carriage for said jack having a length approximately equal to the distance between said housing and the rear end of said vehicle, said arm being disposed adjacent one end of said carriage, a lever pivotally attached to the other end of said carriage, and a reciprocatable connection between said lever and said arm for causing movements of said lever to be correspondingly applied to said shaft.

2. The combination with a hydraulic jack having a rocker-arm pivotally attached to the shaft of the pump mechanism thereof, of an elongated base for supporting said jack at one end thereof, a rock-lever pivotally attached to the other end of said base, and means for causing movements of said lever to be correspondingly applied to said arm for actuating said shaft and pump mechanism.

3. The combination with a hydraulic jack having a rocker-arm pivotally attached to the plunger of the pump mechanism thereof, of an elongated base for supporting said jack at one end thereof, a rock-lever pivotally attached to the other end of said base, a toggle link pivotally attached at its lower end to the base, a rod connecting the rock-lever to the toggle link for imparting corresponding movements to both, and a second toggle link having one end pivotally attached to the rocker-arm and to the first toggle link at a point spaced from its pivot whereby when the rock-lever is moved about its pivot the rocker-arm will be rocked about its pivot and reciprocate the pump plunger.

4. The combination with a hydraulic jack having a reciprocable pump plunger, of an elongated base for supporting said jack at one end thereof, a rock-lever pivotally attached to the other end of said base, a toggle link pivotally attached to the base at a point below the upper end of the plunger, a rod connecting the rock-lever and the toggle link to cause movements of the lever to be correspondingly applied to the toggle link, and a second toggle link having one end pivotally attached to the first toggle link at a point above its base and the other end connected with the plunger by means comprising a pivot whereby when the rock-lever is moved about its pivot, the pump plunger will be reciprocated.

5. The combination with a hydraulic jack having a rocker-arm pivotally attached to the plunger of a pump mechanism thereof, of an elongated base for supporting said jack at one end thereof, the base comprising two separate parts, one of which comprises two parallel tubular members, and the other of which comprises two parallel rods telescopically connected with the tubular members, a rock-lever pivotally attached to the outer end of that portion of the base comprising the parallel rods, means for latching the tubular members and the rods in any predetermined position and means comprising a connecting rod formed from two telescopically connected members for causing movements of the rock-lever to be correspondingly applied to the rocker-arm for actuating the pump plunger.

6. The combination with a hydraulic jack having a rocker-arm pivotally attached to the plunger of the pump mechanism thereof of an elongated base for supporting said jack at one end thereof, a rock-lever pivotally attached to the other end of said base, and means for causing movements of said lever to be correspondingly applied to the rocker-arm for actuating the pump plunger, said means comprising a toggle having a long link pivotally connected with the base, and a shorter link having one end pivoted to the first link above its pivotal connection with the base and the other end pivoted to the rocker-arm, and a rod connecting the rock-lever with the upper end of the longer toggle link.

7. A device in accordance with claim 6 in which the base and the connecting rod are formed from telescopically connected members and have means for latching the members in predetermined extended positions.

8. A device in accordance with claim 1 in which the base is extensible and is formed from two telescopically connected parts.

9. A device in accordance with claim 2 in which the base is extensible and formed from two telescopically connected parts and in which means is provided for latching the two parts in predetermined extended positions.

GLEN PLYMESSER.